Sept. 2, 1924.
J. F. G. SMITH
1,506,949
APPARATUS FOR MAKING AN EDIBLE FOOD PRODUCT
Filed May 6, 1924      2 Sheets-Sheet 1
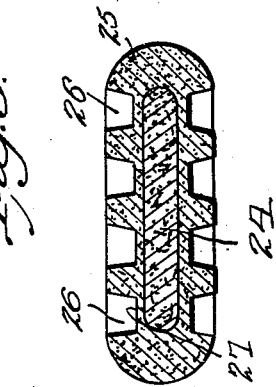
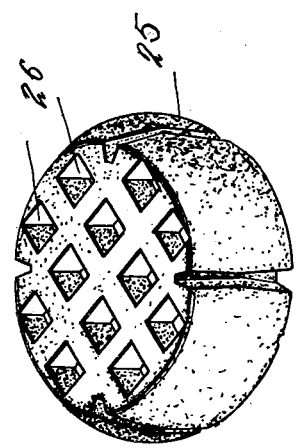
Inventor
J. F. G. SMITH
By
attorney Sept. 2, 1924.  
J. F. G. SMITH  
1,506,949  
APPARATUS FOR MAKING AN EDIBLE FOOD PRODUCT  
Filed May 6, 1924   2 Sheets-Sheet 2
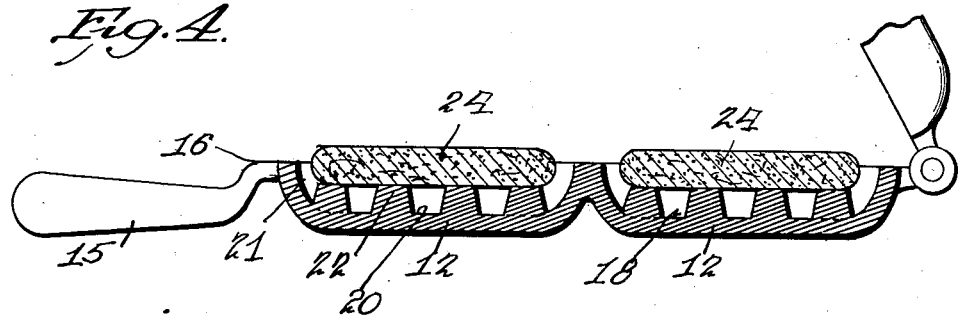
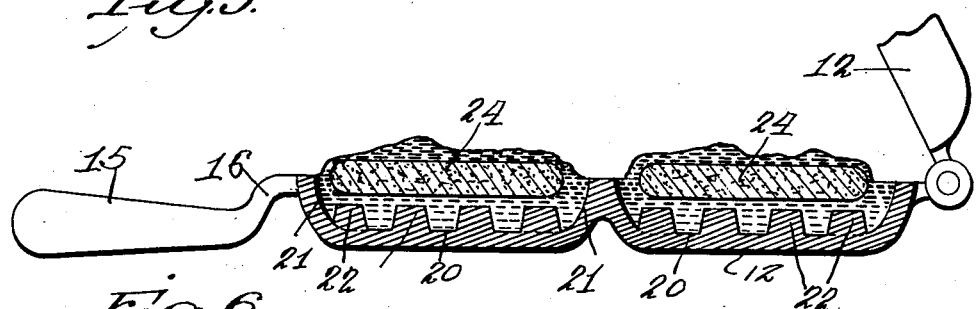
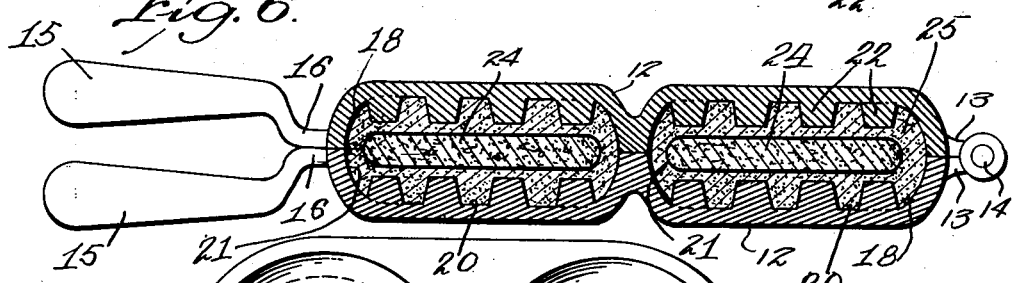
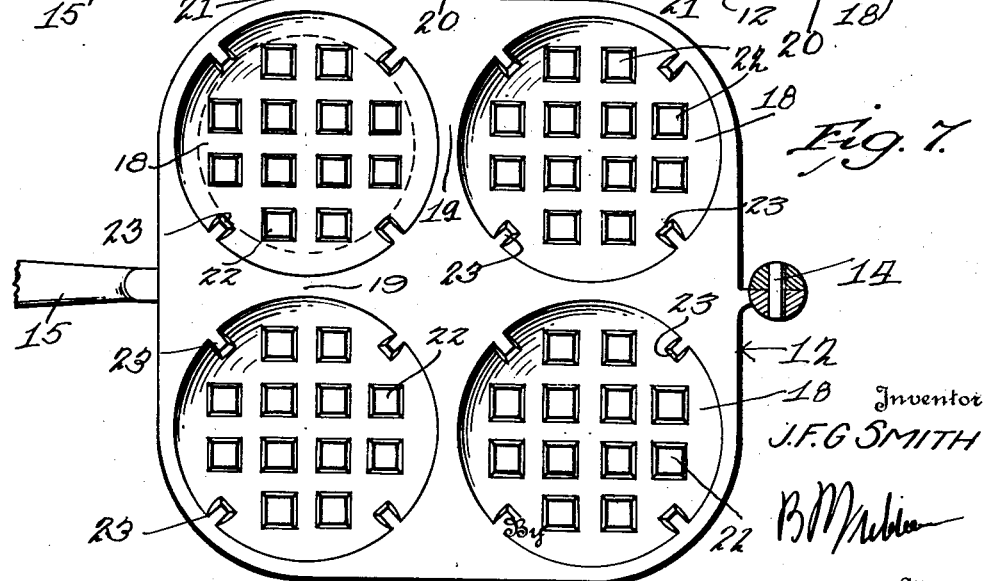
Inventor  
J.F.G SMITH  
Attorney Patented Sept. 2, 1924.

1,506,949

UNITED STATES PATENT OFFICE.

JOHN F. G. SMITH, OF WASHINGTON, DISTRICT OF COLUMBIA, ASSIGNOR OF ONE-THIRD TO WINFIELD PROVOST, AND ONE-THIRD TO CLARENCE A. SMITH, BOTH OF WASHINGTON, DISTRICT OF COLUMBIA.

APPARATUS FOR MAKING AN EDIBLE FOOD PRODUCT.

Application filed May 6, 1924. Serial No. 711,492.

*To all whom it may concern:*

Be it known that I, JOHN F. G. SMITH, a citizen of the United States, residing at Washington, in the District of Columbia, have invented certain new and useful Improvements in Apparatus for Making an Edible Food Product, of which the following is a specification.

My invention relates to an edible food product, the method of producing the same, and the apparatus for use in connection with the method.

An important object of the invention is to provide means of the above mentioned character, whereby a meat filler, such as Hamburg, in a cake form, may be enclosed in a casing of baked batter, such casing being cooked crisp throughout substantially its entire cross sectional area, producing a product which is pleasing in appearance, tasty, and easy to digest.

A further object of the invention is to provide apparatus of the above mentioned character, which is provided with projections which form relatively large recesses in the cooked product, whereby the heat is carried to the interior of the product, for substantial distances, thereby insuring thorough and proper cooking.

Other objects and advantages of the invention will be apparent during the course of the following description.

In the accompanying drawings, forming a part of this specification, and in which like numerals are employed to designate like parts throughout the same, Figure 1 is a side elevation of apparatus embodying my invention, Figure 2 is a perspective view of the product, Figure 3 is a transverse section through the same, Figure 4 is a central vertical longitudinal section through one of the companion iron members, showing the Hamburg therein, prior to the introduction of the batter, Figure 5 is a similar view, showing the batter introduced into the member, and partly cooked, Figure 6 is a similar view showing the companion iron members closed, and the cooking partly or wholly completed, and, Figure 7 is a plan view of one of the companion iron members.

In the drawings, wherein for the purpose of illustration is shown a preferred embodiment of my invention, the numeral 5 designates the frame of a stove, having burners 6 and 7. Over the burner 6 is a pan or sheet constituting a frier. The stove embodies a frame 9, over the burners 7. Gas is supplied to the burners through a pipe 10. The construction of the stove, as given, is not my invention, but is used for the purpose of illustration.

The numeral 11 designates a plurality of irons, which are identical. Each iron comprises a pair of companion iron members 12, having shanks 13, hinged together at 14. The iron members have handle sections 15, provided with shanks 16. The shanks 13 fit in a notch in the frame 9 while the shanks 16 are adapted to fit in notches 17. By raising the handles 15, the iron 11 may be rotated upon the shanks 13, to invert the same.

The iron companion members 12 are provided upon their inner sides with recesses or chambers 18, which are shown as circular, which is the preferred form, although the same may be eliptical or of another shape. Each iron member is shown as provided with four of these recesses, although the number may vary, and the recesses of one iron member register with the recesses of the other iron member, and the intermediate webs 19 of the iron members contact with each other, thus forming closed chambers when the recesses are brought together.

An important feature of the invention is the provision of means for conducting the heat to the interior of the batter, for a substantial distance, during the cooking process, as will be described. For this purpose, each recess 18 is provided with a generally flat bottom 20, leading to an outwardly curved side 21. Cast integral with the bottom 20 are upstanding supporting and heat transmitting posts or lugs 22, which are spaced and grouped, as shown. These lugs or posts are preferably square and have a substantial height or length. Formed integral with the curved side wall 21, adjacent its top, are radial spacing or centering lugs 23, four being shown in each recess 18, although the number may vary. The function of these lugs is to center the meat cake, with respect to the recess, and they of course also serve as heat transmitting elements.

In the use of the apparatus, the companion iron members 12 may be closed, and first heated to a proper temperature for cooking. A little experimentation will readily teach the user as to the desired temperature, and it will be found that a hot iron will probably give better results. It is advisable to suitably grease the interior of both iron members. With the top iron member elevated, the preferably previously cooked meat cake, such as a Hamburg cake 24, which is preferably made substantially flat and generally circular, of suitable diameter, may now be introduced into the recess 18, and will be supported in spaced relation from the bottom wall 20, by the post 22. In producing the product, I employ a fluid batter, that is a batter which will pour, having a consistency of a thick paste, and I employ a batter which will rise freely when cooked, for producing a porous product. A little of this batter may first be introduced into the bottom of the recess 18, prior to the introduction of the meat cake 24 therein. If desired, the meat cake may be first placed upon the stove 22 and the batter poured upon or about the same, the batter flowing around the edge of the cake and passing beneath the same. A little experience will teach the operator the correct amount of batter to pour upon the meat cake, some of the batter remaining upon the top of the same. The upper iron member is now brought to the closed position, and the batter will quickly expand, elevating the meat cake to the central position within the chamber, and passing to the top of the same. It will be found that the product will embody a casing 25, which will completely enclose the meat cake 24. The casing will have depressions 26 therein, which are relatively large and deep, whereby the heat is carried to the central portion of the batter, there remaining relatively thin webs 27 of the batter, adjacent to the meat cake. This will insure the thorough cooking of the casing, producing a product which is highly porous. Of course the product is removed from the iron after the cooking is completed. The iron may be turned any number of times throughout the cooking operation, as found advantageous.

It is to be understood that the form of my invention herewith shown and described is to be taken as a preferred example of the same, and that various changes may be resorted to in the steps of the method, and that changes may be made in the shape, size, and arrangement of the parts of the apparatus without departing from the spirit of my invention, or the scope of the subjoined claims.

Having thus described my invention, I claim:

1. Apparatus of the character described, comprising a pair of companion iron members, each iron member having a recess formed therein, combined supporting and heat transmitting posts formed upon the bottom of the recess and projecting upwardly therefrom for substantial distances, and radial lugs formed upon the side walls of the recess and projecting inwardly therefrom to center a meat cake therein.

2. Apparatus of the character described, comprising a pair of companion iron members, each iron member having a recess formed therein, combined supporting and heat transmitting elements formed upon the bottom of each recess and projecting upwardly therefrom, and lugs formed upon the side wall of one recess and projecting inwardly therefrom and serving to retain the meat cake spaced from such side wall.

In testimony whereof I affix my signature.

JOHN F. G. SMITH.